(No Model.)
G. MEISCHNER.
FEEDING DEVICE FOR SEWING MACHINES.
No. 437,784. Patented Oct. 7, 1890.
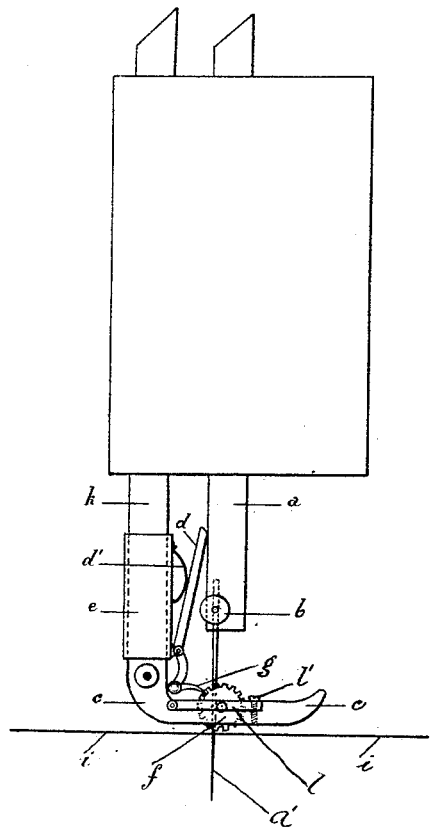
Witnesses.
Alfred Bosshardt.
Stanley Egerton Bramall
Inventor.
Georg Meischner.
per
Ferdinand Bosshardt.
Attorney.

UNITED STATES PATENT OFFICE.

GEORG MEISCHNER, OF FREIBURG, GERMANY.

FEEDING DEVICE FOR SEWING-MACHINES.

SPECIFICATION forming part of Letters Patent No. 437,784, dated October 7, 1890.

Application filed October 7, 1889. Serial No. 326,175. (No model.)

*To all whom it may concern:*

Be it known that I, GEORG MEISCHNER, a citizen of the Empire of Germany, residing at Freiburg, in Germany, have invented a new and useful Feeding and Presser-Foot Device for Sewing-Machines, of which the following is a specification.

My invention relates to improvements in feeding and presser-foot devices for sewing-machines; and the objects of my improvements are, first, to provide the presser-foot with a rotary feeder acting from above the needle-plate; second, to provide means for actuating the rotary feeder intermittently from the needle-bar; third, to afford facilities for varying the amount of feed. I attain these objects by the mechanism illustrated in the accompanying drawing, which represents an end view of the sewing-machine head furnished with the improved feeding and presser-foot device.

Similar letters refer to similar parts.

$a$ is the needle-bar; $a'$, the needle; $c$, the presser-foot; $i$, the needle-plate; $k$, the presser-foot bar.

To the presser-foot $c$ is pivoted an arm $l$, the free end of which is arranged to be raised and lowered by means of a screw $l'$, passing through the same into the presser-foot $c$. On the arm $l$ is mounted a toothed feed-wheel $f$, the periphery of which projects below the presser-foot $c$, so as to act from above upon the material under operation on the needle-plate $i$, and which is intermittently rotated from the needle-bar $a$ by means of a lever $d$ and pawl $g$. On the lower end of the presser-foot bar $k$ is suitably fixed a sleeve $e$, to which is pivoted the lever $d$, carrying at its lower end the pawl $g$, in engagement with the toothed feed-wheel $f$ and its upper end being under the influence of a spring $d'$, attached to the sleeve $e$. In lieu of forming the presser-foot bar $k$ and presser-foot $c$ in one piece, they may be formed separately and connected together by means of the sleeve $e$.

The needle-bar $a$ near its lower extremity is furnished with the screw $b$, which secures the needle $a'$ thereto, and on ascending comes into contact with the upper end of the lever $d$, which causes the latter to rock and the pawl $g$ to impart a partial rotation to the toothed feed-wheel $f$, the spring $d'$ bringing the lever $d$ back to its normal position on the needle-bar $a$ descending.

The amount of feed to be effected by the wheel $f$ may be varied as desired by bringing it nearer to or farther away from the pawl $g$ through raising or lowering by means of the bar $l$ and screw $l'$.

The combination of the presser-foot and rotary feed described facilitates a more regular feed and prevents the displacement of the parts to be united.

What I claim as my invention, and desire to secure by Letters Patent, is—

In sewing-machines, the rocking lever $d$, carried by the presser-bar $k$ on a sleeve $e$, the upper end of which lever $d$ is acted upon by the needle-screw $b$ and spring $d'$ and the lower end furnished with a pawl $g$, in combination with the rotary feed-wheel $f$, mounted on a radially-adjustable arm $l$, pivoted to the presser-foot $c$ and adapted to vary the action of the pawl $g$ on the feed-wheel $f$, substantially as set forth.

In testimony that I claim the foregoing I have hereunto set my hand this 3d day of September, 1889.

GEORG MEISCHNER.

Witnesses:
EMILE KANTER,
GUILLAUME ANTHONISSEN.